Patented Nov. 28, 1922.

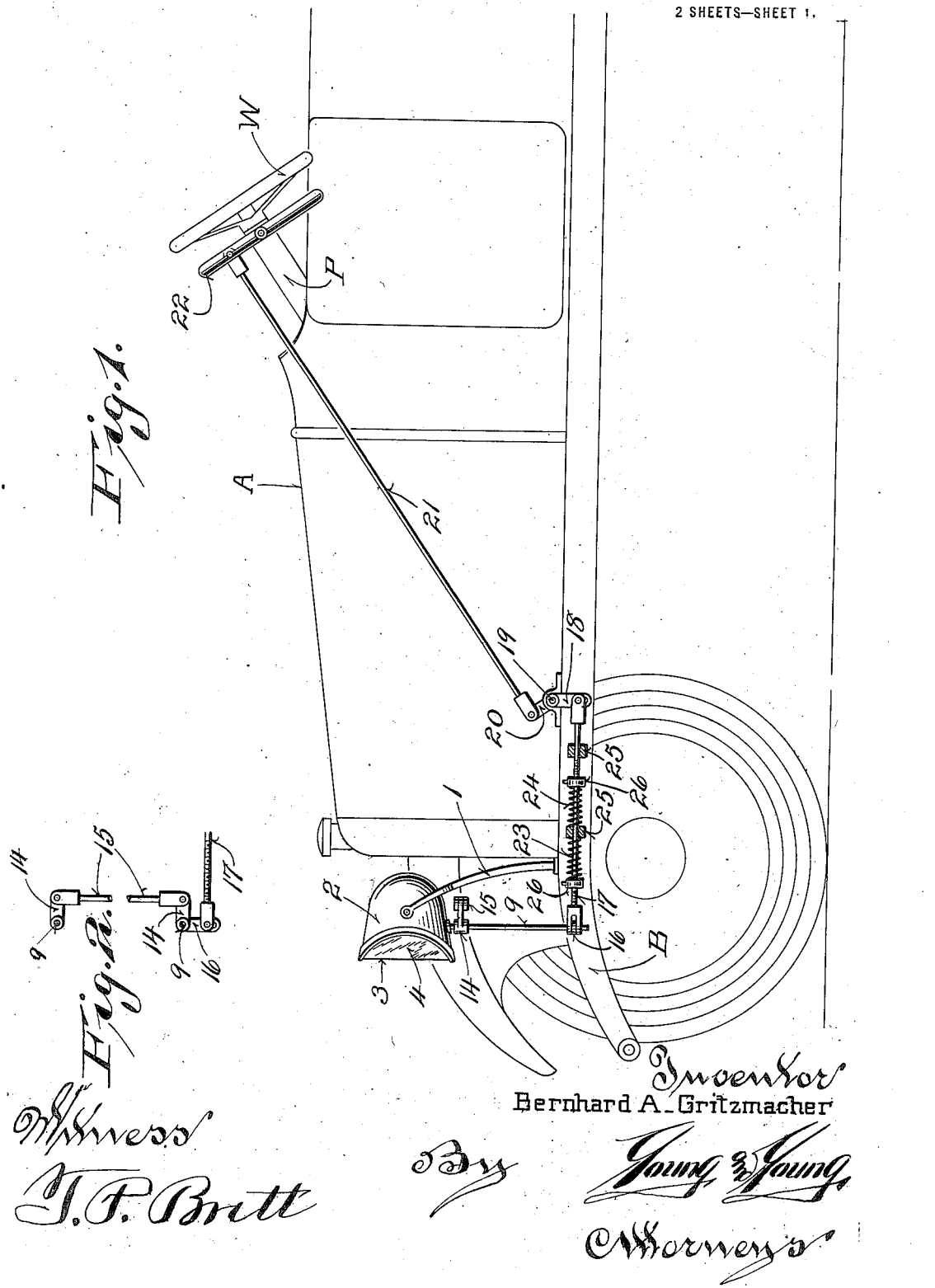

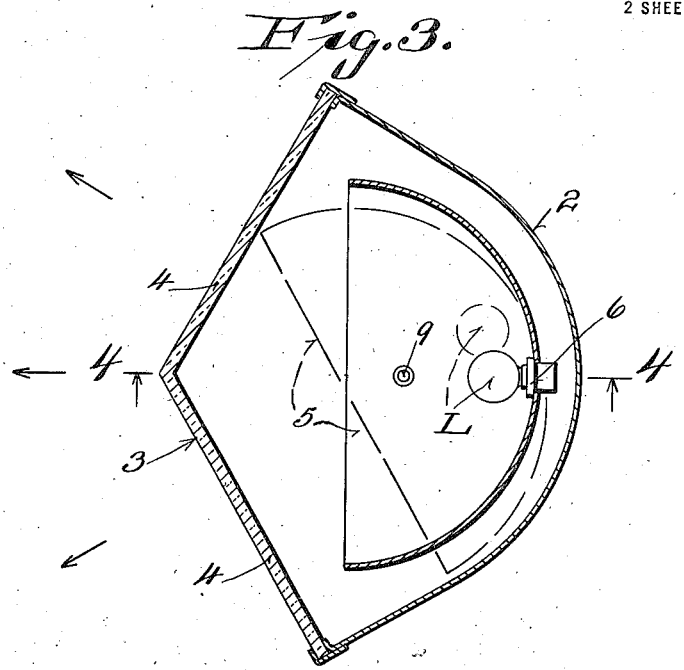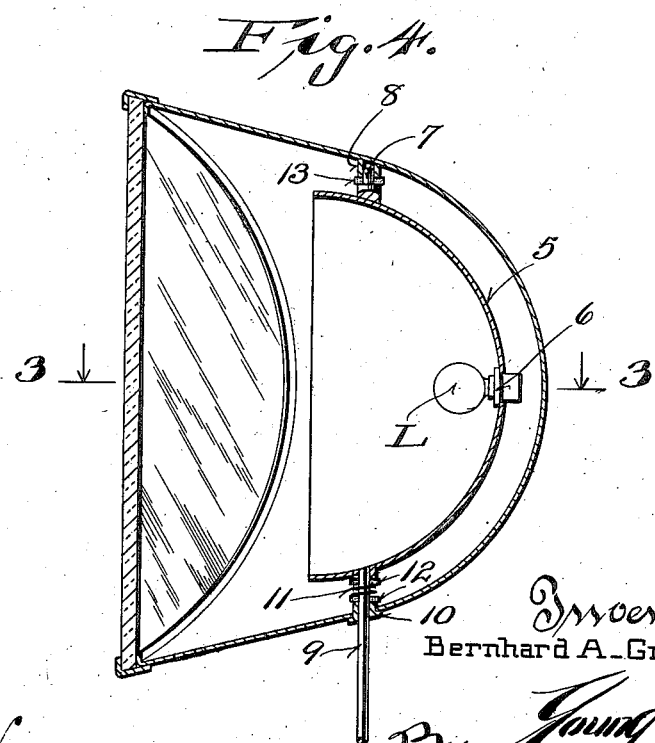

1,436,800

UNITED STATES PATENT OFFICE.

BERNHARD A. GRITZMACHER, OF WATERTOWN, WISCONSIN.

DIRIGIBLE HEADLIGHT.

Application filed March 15, 1920. Serial No. 365,753.

*To all whom it may concern:*

Be it known that I, BERNHARD A. GRITZMACHER, a citizen of the United States, and resident of Watertown, in the county of Jefferson and State of Wisconsin, have invented certain new and useful Improvements in Dirigible Headlights; and I do hereby declare that the following is a full, clear, and exact description thereof.

My invention relates to new and useful improvements in dirigible lamps, particularly those for use on vehicles.

The principal object of this invention is to provide a simply constructed head-light or the like having a relatively stationary casing, but equipped with means for throwing the rays of light to different directions, such means being operable at a distance from the lamp.

It is also an object of the invention to provide a head-light or the like with means for rocking the reflector so as to throw the rays of light to different directions. In this connection it is a minor object of the invention to provide a lens having two light radiating faces through which rays of light may be thrown by the reflector when the same is moved to either side of a normal position.

It is an additional object of the invention to provide a vehicle lamp with means for turning the same to different directions together with means for returning the same to a normal position after having been shifted.

When my invention is used in connection with motor vehicles, the same is so arranged that it can be manipulated by the driver of the vehicle without removing his hands from the steering wheel, and this feature forms a further object of the invention.

With these general objects in view the invention resides in the novel features of construction, combination and arrangement of parts which will be hereinafter more particularly described and claimed and shown in the drawings, wherein:

Figure 1 represents a side elevational view of the forward end of an automobile, the same being diagrammatically illustrated for the purpose of showing the relationship of the different parts of my invention thereto.

Figure 2 is a detail horizontal sectional view of the links, etc., which connect the two vehicle head-lights and cause them to operate in unison.

Figure 3 is a horizontal section through a head-light constructed in accordance with my invention, said section being taken on the plane of the line 3—3 of Figure 4, and Figure 4 is a vertical section through the headlight shown in Figure 3, said section being on the plane of the line 4—4 of the last mentioned figure.

Referring more particularly to the drawings, the reference character A denotes an automobile having the usual steering wheel W and steering post P whereby the machine is controlled. As is customary, lamp brackets 1 are mounted on the front end of the vehicle, preferably upon side bars B thereof. In the present instance these lamp brackets 1 carry head-light casings 2, which as customary are substantially cup-shaped and have open front faces through which rays of light are reflected.

The casings 2 which I use in connection with my invention are clearly shown in Figures 3 and 4 and are provided with substantially V-shaped lenses 3 which, by reason of their nature provide a pair of light radiating faces 4. The juncture of the faces 4, or in other words the apex of the V, is extended outwardly so as to provide a considerable space within the casing. Any preferred manner of mounting the lenses 3 in the casings 2 may be employed within the scope of the present invention.

Disposed within each of the casings 2 is a cup-shaped reflector 5, the same having a lamp socket 6 in its bottom in which a lamp L is carried. The upper portion of the reflector 5 has a trunnion 7 which is journally mounted in a bearing socket 8, while its lower portion has a shaft 9 connected therewith, the same forming an extended trunnion which is journalled in a bearing 10 carried by the casing 2. The bearings 8 and 10 are vertically aligned so that the reflector 5 may be rotated on a vertical axis and thus shift the lamp L to either side of the center line of the casing 2 as shown by the broken lines in Figure 3. The reflector 5 being spaced from the wall of the casing 2 and from the lens 3, a considerable range of movement thereof is possible whereby the rays of light may be selectively directed through either of the faces 4 of the lens or through both of said faces. The reflector 5 is retained against any except horizontal movement by means of any expansible spring 11 disposed around the shaft 9 and between fibre washers 12; a similar washer 13 is located on the trunnion 7 to aid the spring in preventing unnecessary movement or rattling on the part of the reflector 5.

Each of the shafts 9 adjacent the casing 2 is provided with a crank 14 connected by a link 15 whereby similar movement may be simultaneously imparted to both of the shafts to thus cause the reflectors 5 to shift in unison. One of the shafts 9 also has a second crank 16 extended therefrom to which a slide rod 17 is pivoted at one end, the opposite end thereof being loosely connected with a depending crank 18 extending from a rock shaft 19. A connecting rod crank 20 is carried by the rock shaft 19 and has a connecting rod 21 pivoted thereto and to one end portion of a control lever 22.

Any means other than the control lever 22 may well be used for rocking the shafts 9 and 19, but I have found that this particular form of device may be easily manipulated by the vehicle driver. In other words this lever is pivoted midway its ends on the steering post P and just below the steering wheel W so that the driver may move the same in different directions without removing his hands from the latter.

Inasmuch as under normal operating conditions it is most desirable to throw the rays of light from the head lamps directly ahead of the machine, the reflectors 5 are normally retained as indicted in full lines in Figure 3 which disposes the lamps L axially of the casings 2. Thus when the reflectors are moved to throw the light through either of the faces 4 of the lenses 3 by shifting the control lever 22, they will be automatically returned to normal position upon release of said lever. The means for accomplishing this result in the present instant comprises a pair of expansible coil springs 23 and 24 surrounding the slide rod 17. These springs are spaced apart by a combination guide and stop 25 carried by one frame bar B, the opposite ends of said springs being in engagement with adjustable stop collars 26 carried by the rod 17. Thus when the reflectors are shifted in one direction, the spring 23 returns the same to normal position, whereas when these parts are shifted to throw the rays of light in the opposite direction, the other spring returns all of the movable elements of the invention to their normal inactive position.

It will be seen from the foregoing description taken in connection with the accompanying drawings that I have not only invented a very efficient type of head lamp, but one by which the rays of light may be thrown to one side or the other of the roadway to aid the vehicle driver in steering his machine around corners and off of the main road-way. The ability of the movable reflectors to return to normal position after having been shifted in also a very important feature of the invention. Various changes may be made in the different parts of the invention, for instance to accommodate the same to different types of automobiles, without departing from the principles or sacrificing any of the advantages thereof.

I claim:

In a device of the character described, a casing, vertically aligned bearings in said casing, a reflector having trunnions thereon mounted in said bearings, one of said trunnions being extended beyond its bearing and provided with an arm outside the casing, operating means adapted to be attached to the steering wheel of an automobile, an operative connection between said means and said arm for rocking said reflector on its trunnions, a bulb carried by said reflector in rear of its axis of oscillation and a V-shaped lens in the front part of said casing, the V being formed by two vertical planes intersecting in a vertical line in front of the axis of oscillation of said reflector, said operating means being actuable to move said reflector until the plane of the front edge thereof is parallel to the plane of a part of said lens, whereby the light will be emitted directly through the plane of said part.

In testimony that I claim the foregoing I have hereunto set my hand at Watertown, in the county of Jefferson and State of Wisconsin.

BERNHARD A. GRITZMACHER.